US005661283A

United States Patent [19]

Gallacher et al.

[11] Patent Number: 5,661,283

[45] Date of Patent: Aug. 26, 1997

[54] AUTOMATED PATCHING BETWEEN ATM AND CONSULTANT

[75] Inventors: Kenneth D. Gallacher, Carnoustie; Mark M. Grossi, Muirhead; Grant C. Paton, Dundee; James Piggot, Downfield, all of Scotland; George E. Schneider, Springboro, Ohio

[73] Assignee: NCR Corporation, Dayton, Ohio

[21] Appl. No.: 538,313

[22] Filed: Oct. 3, 1995

[51] Int. Cl.[6] .......... G06F 17/60

[52] U.S. Cl. .......... 235/379; 235/380

[58] Field of Search .......... 235/379, 380; 379/67, 88, 91, 113

[56] References Cited

U.S. PATENT DOCUMENTS

| | | | |
|---|---|---|---|
| 4,757,267 | 7/1988 | Riskin | 379/113 |
| 4,797,911 | 1/1989 | Szlam et al. | 379/67 |
| 5,231,571 | 7/1993 | D'Agostino | 364/408 |
| 5,487,103 | 1/1996 | Richardson, Jr. et al. | 379/88 |

OTHER PUBLICATIONS

San Francisco Chronicle, May 18, 1992, "New Automatic Teller Has A Video System" p. C5.

Akron Beacon Journal, Dec. 10, 1991, "Teleconferencing Comes to Columbus" p. D5.

Plain Dealer (Cleveland), May 19, 1992, "New NCR ATMS Offer Video–Hookup Interaction" p. 5G.

"AT&T Chips Could Lower Cost Barrier", Apr. 13, 1992 Product Announcement.

U.S. Serial No. 08/403,095; filed Mar. 13, 1995.

U.S. Serial No. 08/403,145; filed Mar. 13, 1995. 5,604,341.

U.S. Serial No. 08/403,150; filed Mar. 13, 1995.

U.S. Serial No. 08/501,686; filed Jul. 12, 1995.

*Primary Examiner*—Donald T. Hajec
*Assistant Examiner*—Jeffrey R. Filipek
*Attorney, Agent, or Firm*—Gregory A. Welte; Michael Chan

[57] ABSTRACT

The invention concerns Automated Teller Machines (ATMs) which are equipped with video conferencing capability. The ATM allows a customer to undertake numerous different types of transactions, such as withdrawing cash, checking a balance, applying for a loan, obtaining interest rate quotations, and so on. If a customer needs assistance with a transaction, the invention (a) identifies the transaction, without intervention of the customer, (b) selects a consultant who is expert in the type of transaction identified, and (c) establishes a video conference with the selected consultant.

6 Claims, 11 Drawing Sheets

AUTOMATED PATCHING BETWEEN ATM AND CONSULTANT

The invention concerns Automated Teller Machines (ATMs), at which a user may execute multiple, different transactions. A user may request assistance with a transaction. When the user does, the invention establishes an audio or video conference, or both, between the user and a consultant. In addition, the invention selects a consultant having expertise which is relevant to the particular transaction which the customer was undertaking at the time.

BACKGROUND OF THE INVENTION

Historically, Automated Teller Machines (ATMs) have been used primarily for routine operations such as dispensing cash, making cash advances, providing account balance information, and the like. The capabilities of the machines have been limited to those of a bank teller, consistent with the designation "Automated Teller Machine."

The Applicants believe that the capabilities of the ATM can be extended beyond merely automating the function of the bank teller. The ATM can assume, or at least assist, functions performed by bank officers, such as granting of loans and extending lines of credit.

The extension of ATM capabilities will lead to more complex transactions being handled by the ATMs. It is possible that customers will not be able to deal with all possible transactions without outside assistance. Video conferencing equipment can provide assistance to the customer.

OBJECTS OF THE INVENTION

An object of the invention is to provide an improved ATM.

Another object is to provide an ATM having video conferencing capabilities.

Another object is to provide an ATM at which a customer can undertake a sequence of transactions, and which automatically establishes video conferences with different people, depending on the stage of the customer's transaction.

SUMMARY OF THE INVENTION

In one form of the invention, an ATM identifies each transaction undertaken by a customer. When a customer requests assistance with a transaction, the invention selects a consultant having expertise with the current transaction, and establishes a video conference with the selected consultant.

DETAILED DESCRIPTION OF THE INVENTION

ATMs having Video Conferencing Ability

Figure 1:
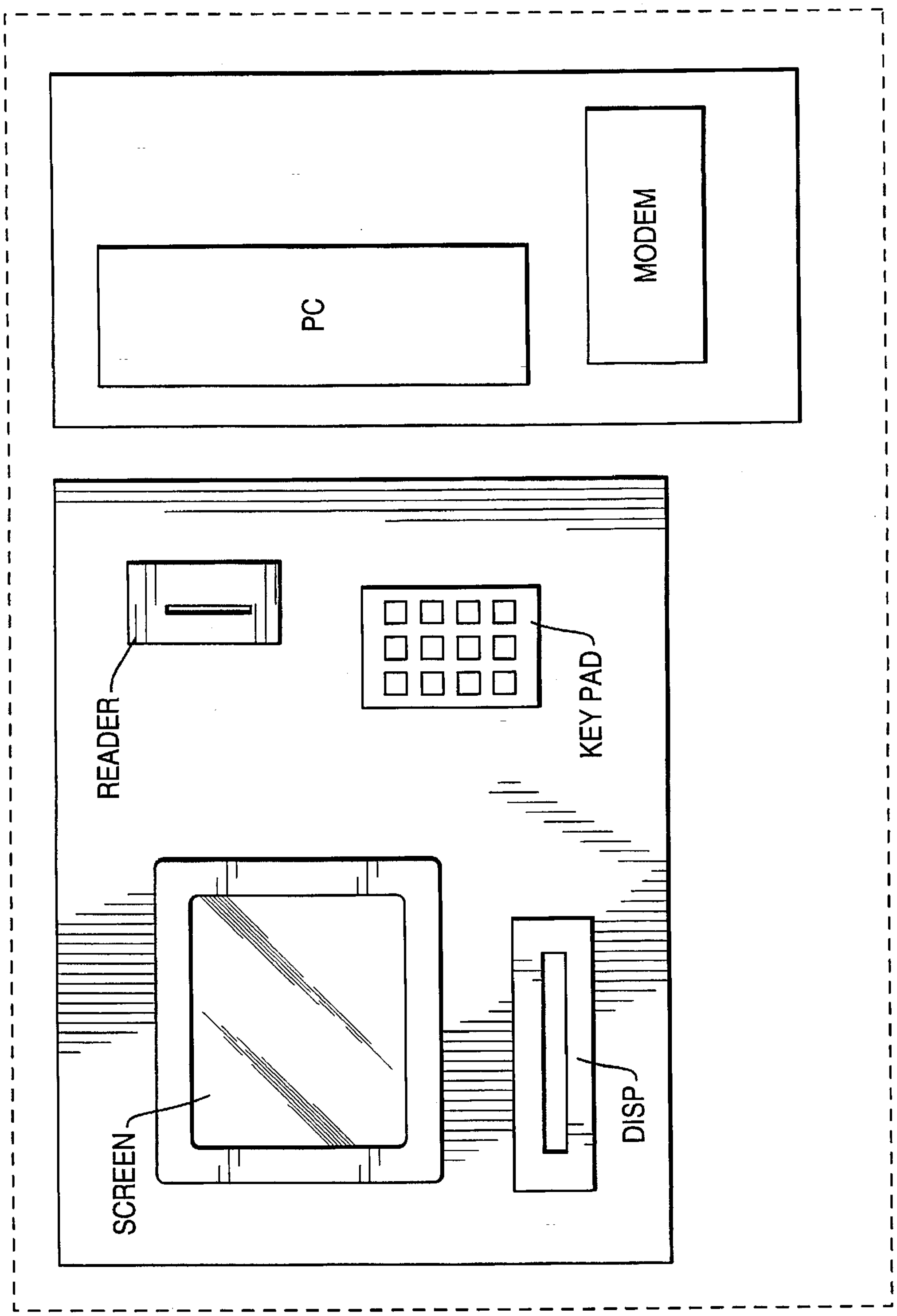
FIG. 1 PRIOR ART
FIG. 1 illustrates a prior-art ATM.

FIG. 1 illustrates, in schematic form, some of the equipment contained in a prior-art ATM. The equipment includes a Personal Computer (PC) and a MODEM. The latter allows the PC to communicate with the financial institution. The equipment also includes the following:

A magnetic card READER, which reads an identification card presented by a user of the ATM.

A keypad, labeled KEYP, which allows a user to enter data. (The keypad need not take the form of physical, spring-loaded, movable keys, but a touch-sensitive screen can be used, as discussed below.)

A dispenser, labeled DISP, which dispenses currency to the customer.

A video display, labeled SCREEN, which allows the PC to display information to the customer.

The PC runs commercially available software, in order to control the ATM, and handle the customer transactions. One type of such software is that known as ICON AUTHOR or "Composer" software, available from AT & T Corporation, GIS division, Dayton, Ohio.

Figure 2:
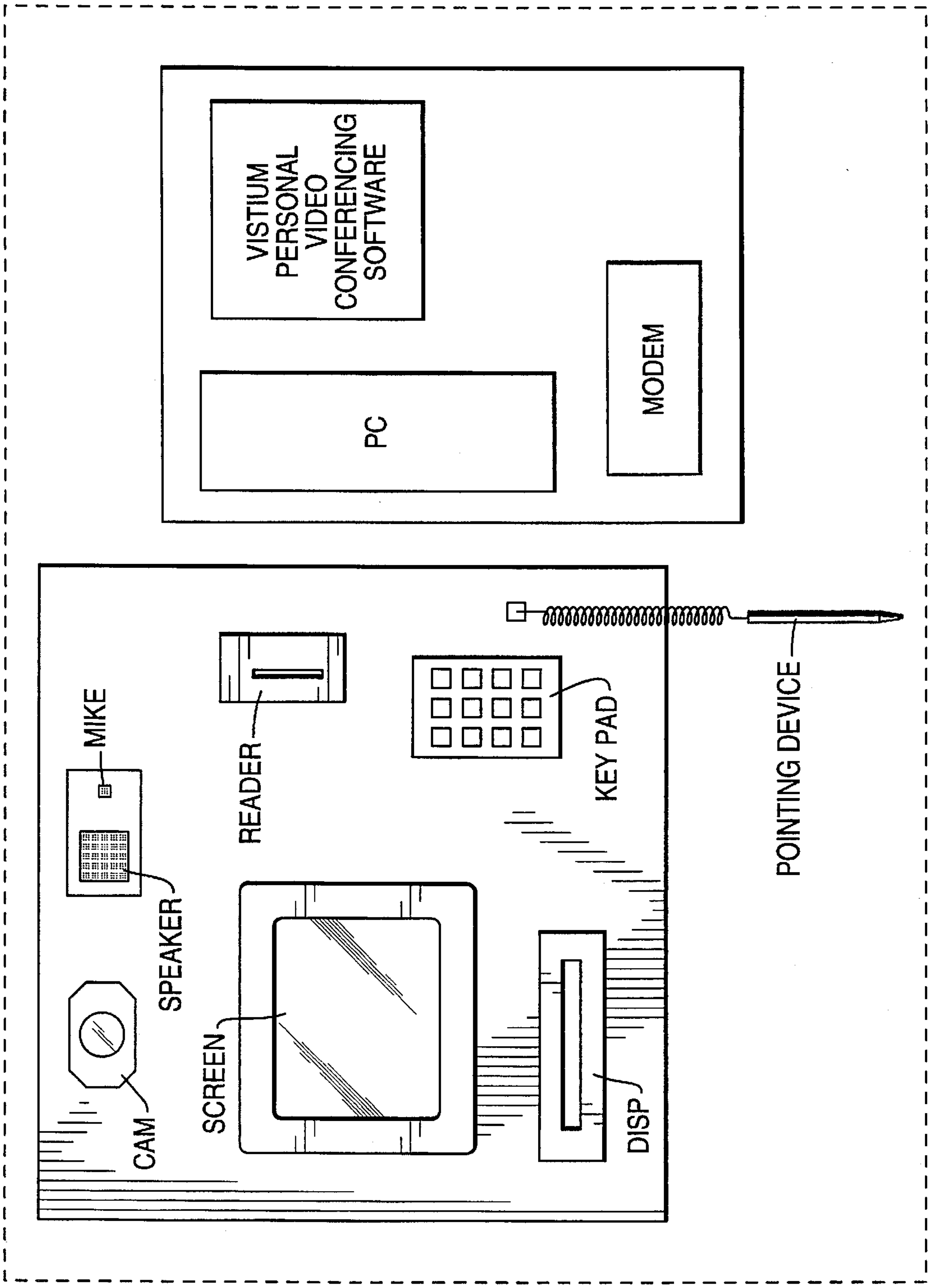
FIG. 2 illustrates a prior-art ATM, but with video conferencing equipment added.

One form of the invention adds the equipment shown in FIG. 2. This added equipment includes the following:

A video camera, labeled CAM.

An audio speaker, labeled SPKR.

An audio microphone, labeled MIKE. (SPKR and MIKE may be consolidated into a single telephone handset.)

A POINTING DEVICE, such as a light pen, pen-type trackball, or mouse.

VISTIUM PERSONAL VIDEO CONFERENCING SOFTWARE, which is a commercially available product, which can be purchased from AT & T Global Information Solutions Company, Naperville, Ill. An early version of this product was designated "Telemedia Connection." An alternate type of video conferencing system is that known as "PCS 50" available from PictureTel Corporation, located in Danvers, Mass.

One type of ATM which is equipped with video conferencing equipment is that sold as model number AT & T 5682, available from AT & T Global Information Solutions Company, Dayton, Ohio.

The video conferencing equipment allows a user of the ATM to establish an audio or video conference with a compatible video conferencing station, or with a remote computer, if properly equipped. In a video conference, each party can speak to, and hear, the other, by means of the speaker SPKR and microphone MIKE in FIG. 2. Also, each party can see, on the SCREEN, the image which is captured by the camera CAM of the other party. This image can include the face of the other party, or an object, such as a document, which the other party presents to the camera CAM.

One Form of Invention

The invention utilizes the type of ATM shown in FIG. 2. The ATM allows a customer to undertake multiple different transactions, such as obtaining cash, verifying an account balance, and other transactions. The different transactions are, of course, undertaken in sequence, and the invention monitors the customer's progression through the sequence.

During any transaction, the invention allows the customer to request assistance, through a video conference, from the financial institution operating the ATM. Further, the video conference is established in a particular way, which will be explained by contrast with a different approach.

One Approach

Consider a mail-order sales organization. When a person telephones to order merchandise, or to make an inquiry, the caller is generally placed into a queue, because all sales representatives are usually occupied when the call arrives. When a representative becomes available, that representative answers the person's call. However, this representative Was, in effect, selected randomly, because that particular representative happened to become available at the time the caller happened to become first in the queue. There was no intelligence in the process of selecting the representative.

Invention Applies Intelligence

In contrast to this approach, the invention selects the consultant in a non-random, intelligent manner. The invention selects a consultant who is expert in the type of transaction which the customer was undertaking when the customer requested assistance. A simple example will illustrate.

EXAMPLE

Figure 3:
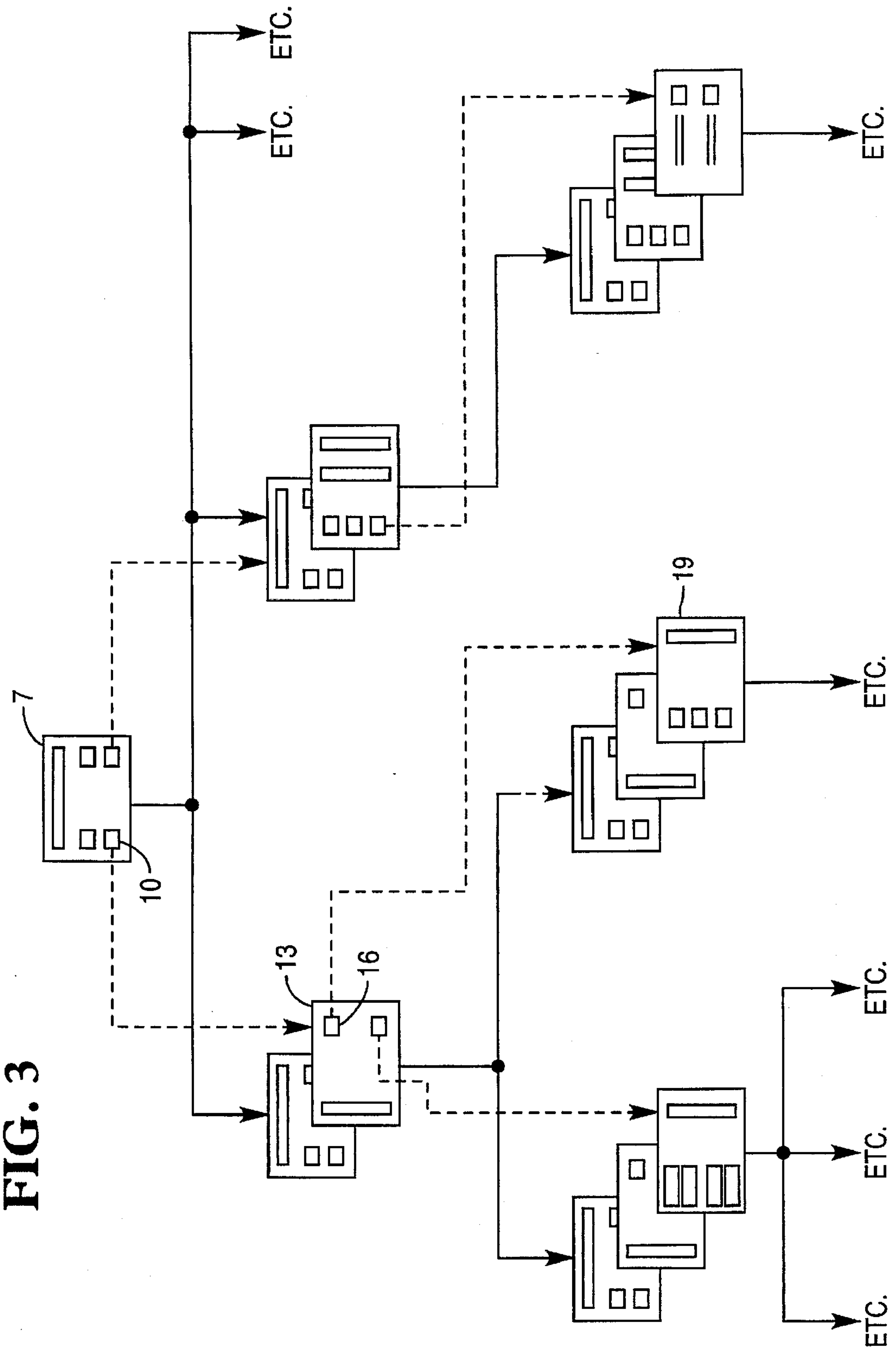
FIG. 3 is a simplified illustration of sequences of windows through which a customer negotiates in making transactions. (Subsequent windows are shown as overlying previous windows, so that the display shows not only the present window, but also parts of previous windows. An alternate approach is that the display shows the present window exclusively.)

A customer deals with the ATM by a series of windows, or screens, which are generated by the PC, as known in the art. FIG. 3 illustrates a hypothetical sequence of windows. The customer begins in window 7. If the customer selects option 10 (which may be a request for cash withdrawal from a checking account), then the PC generates window 13 (which allows the customer to select the amount to be withdrawn, and other details). If, while in window 13, the customer then selects option 16 (which may be a request for a print-out of the checking account balance), the PC Generates window 19 (which allows the customer to specify certain necessary information, such as dates which the print-out is to cover), and so on.

Ascertaining Present Transaction

Prior-art ATMs contain software which monitors the operation of the ATM. One type of such software is available from AT & T Global Information Solutions Company, Dayton, Ohio, under the designation Self Service System Software (SSSS, or $S^4$). This $S^4$ software monitors the transactions of the customer, by recording:

(a) each window in FIG. 3 which is displayed to a customer, (b) the time-of-day at which each window was displayed (c) the length of time each window was displayed, (d) the options taken in each window by the customer, and other events.

Figure 4:
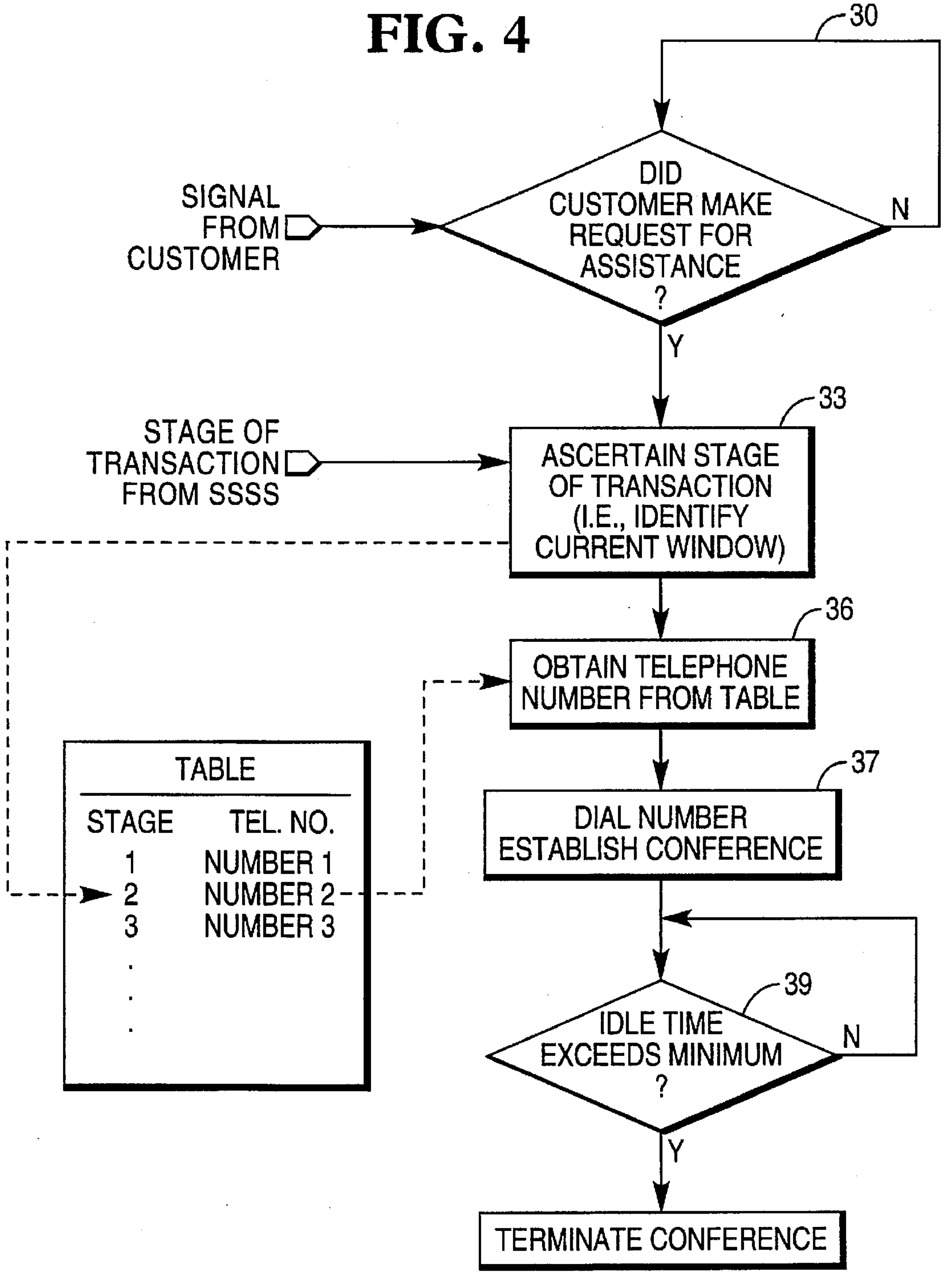
FIG. 4 illustrates logic which implements detection of a request for assistance, and establishes an audio or video conference with a proper consultant.

The invention utilize the monitoring feature of the $S^4$ software to identify the transaction presently undertaken by the customer at the time when the customer requests assistance. The invention then identifies a consultant who is experienced in such transactions, and establishes a video conference with that consultant. FIG. 4 is a flow chart of logic which accomplishes this process.

Customer Requests Assistance

The invention idles in loop 30, awaiting a request for assistance from the customer. When the request is detected, the invention branches out of the loop, along the YES path, to block 33.

The request can be made, and detected, in numerous ways. For example, an electrical switch, labeled "PRESS FOR ASSISTANCE" can be provided at the ATM. The customer actuates the switch when assistance is requested, thereby producing the SIGNAL FROM CUSTOMER in FIG. 4. Alternately, the cradle which holds the telephone handset, discussed above, can be equipped with a detector, such as a mechanical switch or a proximity detector, which detects withdrawal of the handset. This detector issues the SIGNAL FROM CUSTOMER shown in FIG. 4.

(It should be observed that the logic of FIG. 4 becomes active only after the customer logs into the ATM, in the usual manner. Otherwise, unauthorized persons, such as pranksters, could possibly actuate the assistance function.)

Invention Identifies Transaction

When the logic reaches block 33, the invention ascertains the present stage of the customer's transactions. The invention does this by using the output of the $S^4$ software, which identifies the window presently seen by the customer. For example, window 19 in FIG. 3 may be the window displayed at the time of the request. The $S^4$ system provides the identity of this window to block 33 in FIG. 4, as indicated by the phrase STAGE OF TRANSACTION FROM SSSS.

Invention Selects Consultant and Establishes Video Conference

The logic proceeds to block 36, wherein a telephone number is obtained from a TABLE, which is stored in memory available to the PC of FIG. 1. The TABLE associates a telephone number (TEL. NO.) with each STAGE of the transaction. In effect, a telephone number is associated with each window shown in FIG. 3. (Of course, the same telephone number may be associated with two different windows, because a single consultant may be possess expertise in two fields.)

Each telephone number corresponds to a particular video conferencing station which is staffed by a person having expertise in the subject matter of the window (or stage) associated with the telephone number. For example, if window 13 in FIG. 3 deals with cash withdrawals from a checking account, then the telephone number in the TABLE of Figure, which is associated with this window, would correspond to a video conferencing station of a manager of checking account services.

By contrast, this telephone number would not, in general, correspond to a person who handled inventory financing for businesses.

After the telephone number is obtained from the TABLE, the invention dials the number and establishes a video conference, as indicated in block 37. This is done in a straightforward manner, by delivering the number to the VISTIUM system, and ordering the VISTIUM system to establish the conference.

Invention Detects Absence of Customer

It is possible that the customer may leave the ATM abruptly. Block 39 monitors such activity, and automatically terminates the video conference when it is detected. The detection can be undertaken in several ways. One is to detect whether the ATM has become IDLE, because of lack of customer input for a predetermined period, as indicated.

Another is to detect whether sound is received by the microphone MIKE in FIG. 2 (or by a telephone handset). Another is to equip the ATM with proximity detectors, to detect the presence of persons.

Additional Considerations

1. The preceding discussion has been framed in terms of establishing a video conference. In some circumstances, a given ATM may be limited to audio conferences only (i.e., telephone calls). Also, for some consultants, a given ATM may establish audio conferences, while, for other consultants, the ATM may establish video conferences. These differences can be implemented by storing appropriate telephone numbers in the TABLE of FIG. 4.

For example, if the TEL.NO. associated with a given transaction represents an actual telephone, then an audio conference will be established when the number is dialed. On the other hand, if the TEL.NO. represents a video conferencing station, then a video conference will be established when the number is dialed.

Thus, quite simply, a telephone number for a telephone is stored for audio conferences, and a telephone number for a video conferencing station is stored for video conferences.

In general, video conferences utilize different data channels than do audio conferences. An audio conference, or ordinary telephone call, utilizes a POTS ("Plain Old Telephone Service") channel, which has a maximum data capacity in the range of 16,000 bits/sec. A video conference requires a much higher data rate, which will be elaborated in point number 2, below.

2. The data transmission system used for video conferencing conforms to IEEE (Institute of Electrical and Electronics Engineers) standards H.221, T.120, and H.320. The VISTIUM software generates a window on the SCREEN in FIG. 2 which conforms to CIF and QCIF standards.

Under the CIF standard, the transmitted video image occupies a window on the SCREENs of about 352 pixels horizontally, and 288 pixels vertically. (The QCIF uses a window in which each dimension is one-half that in CIF, thus using one-fourth the number of pixels of CIF.)

ISDN (Integrated Services Digital Network) is a commercially available telephone service. Two ISDN channels allow a total transmission of 128 Kbits/sec. Of this data, the VISTIUM system uses 112K bits for video, and 16K for audio, providing a video rate of about 17 frames per second, using compression.

This rate provides substantially full-motion video, with synchronous audio. The video is not strictly pure full-motion video, because if extremely rapid motion of a subject within the video image occurs, then the full-motion becomes disrupted. However, disruption is expected to be rare, for two reasons. One, statistically speaking, such motion is expected to be infrequent in the types of video conferences under consideration.

Two, the conference participants will quickly learn that excessive, rapid motion will disrupt the video, and will naturally suppress such motion.

Therefore, the video can be described as substantially full-motion because (a) the video is, in fact, full-motion, if normal human movements are involved, and (b) the occurrences of rapid, disruptive motion of the conference participants is expected to be minimal, or non-existent.

Based on the foregoing, as a minimum, the invention provides video conferencing at a minimum rate of 10 frames per second, with synchronous audio.

In contrast, normal telephone lines, such as those available in 1995, provide a maximum data rate of about 30 KBits per second. Of this, the audio signal in a video conference requires about 4 Kbits per second, leaving about 26 Kbits per second remaining for video. Thus, for a video window of comparable size to a CIF window, the frame rate for a normal telephone line must drop to about 25 percent of the CIF rate, because the video data rate is about 26K, which is about 25 percent of the 112K used by the invention. 25 percent of the CIF rate is not full-motion video. From another point of view, one particular video window used in the prior art is about 128×128 pixels in size. It is well known that, using an ordinary telephone line, a typical frame rate is in the range of 7 frames per second. If synchronous audio is also used, the frame rate drops to about 5 frames per second.

Figure 5:
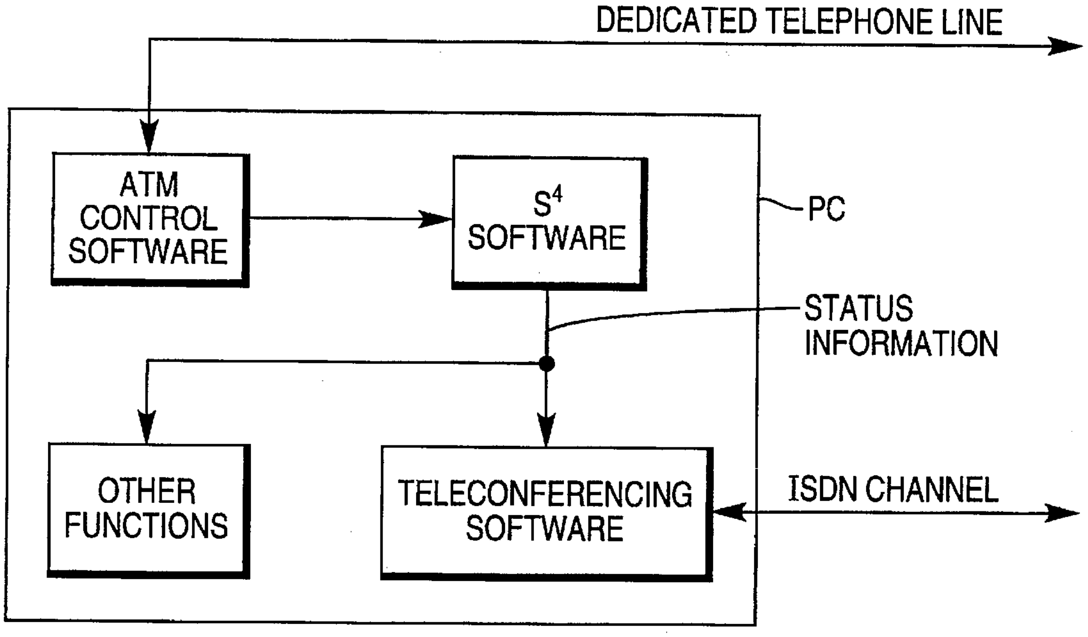
FIG. 5 illustrates architecture for one form of the invention.

3. FIG. 5 shows a simplified view of the architecture representing one form of the invention. The ATM CONTROL SOFTWARE handles functions such as

- logging in,
- checking with the financial institution to ascertain whether a customer's account contains funds,
- controlling the cash dispensing system,
- printing receipts,
- transmitting data to the financial institution to update the customer's account,
- logging out, and so forth.

The ATM CONTROL SOFTWARE communicates with the financial institution (perhaps through a network) using the DEDICATED TELEPHONE LINE indicated. That is, the ATM CONTROL SOFTWARE is limited to the telephone numbers allowed by the DEDICATED TELEPHONE LINE. In general, a single number is allowed. Similarly, no outside parties can call the ATM, unless they have access to the DEDICATED TELEPHONE LINE.

The amount of data carried by the DEDICATED TELEPHONE LINE, for each customer, is quite small, in the range of one hundred bits total, and certainly less than one thousand bits total.

The $S^4$ SOFTWARE in FIG. 5 monitors the ATM CONTROL SOFTWARE. In addition to the functions of the $S^4$ described above, some examples of the functions performed by this $S^4$ software are the following.

- It monitors operation of equipment within the ATM, and reports malfunctions. For example, if a printer ribbon breaks, the $S^4$ software reports this.
- In ATMs which are equipped with proximity sensors (which detect the approach of customers), the $S^4$ software detects the approach, and issues a signal in response.

The invention utilizes information provided by the $S^4$ SOFTWARE, as discussed above, in order to establish a video conference. The video conference is handled by the TELECOMMUNICATION SOFTWARE (such as the VISTIUM system), which uses commercially available ISDN CHANNELs, as indicated.

Two differences between the ISDN CHANNELs and the DEDICATED TELEPHONE LINE are the following:

(1) Data rates—ISDN transmits 128 KBits/sec, as discussed above, while the DEDICATED TELEPHONE LINE transmits hundreds of bits, in total.

(2) Limited access—The TELECOMMUNICATION SOFTWARE uses the common-carrier telephone system, and can dial, and connect with, any operative telephone number. Also, the TELECOMMUNICATION SOFTWARE can receive incoming calls from other video conferencing systems. In contrast, the ATM CONTROL SOFTWARE is limited in the calls it can make, and the calls it can receive, as discussed above.

Figure 6:
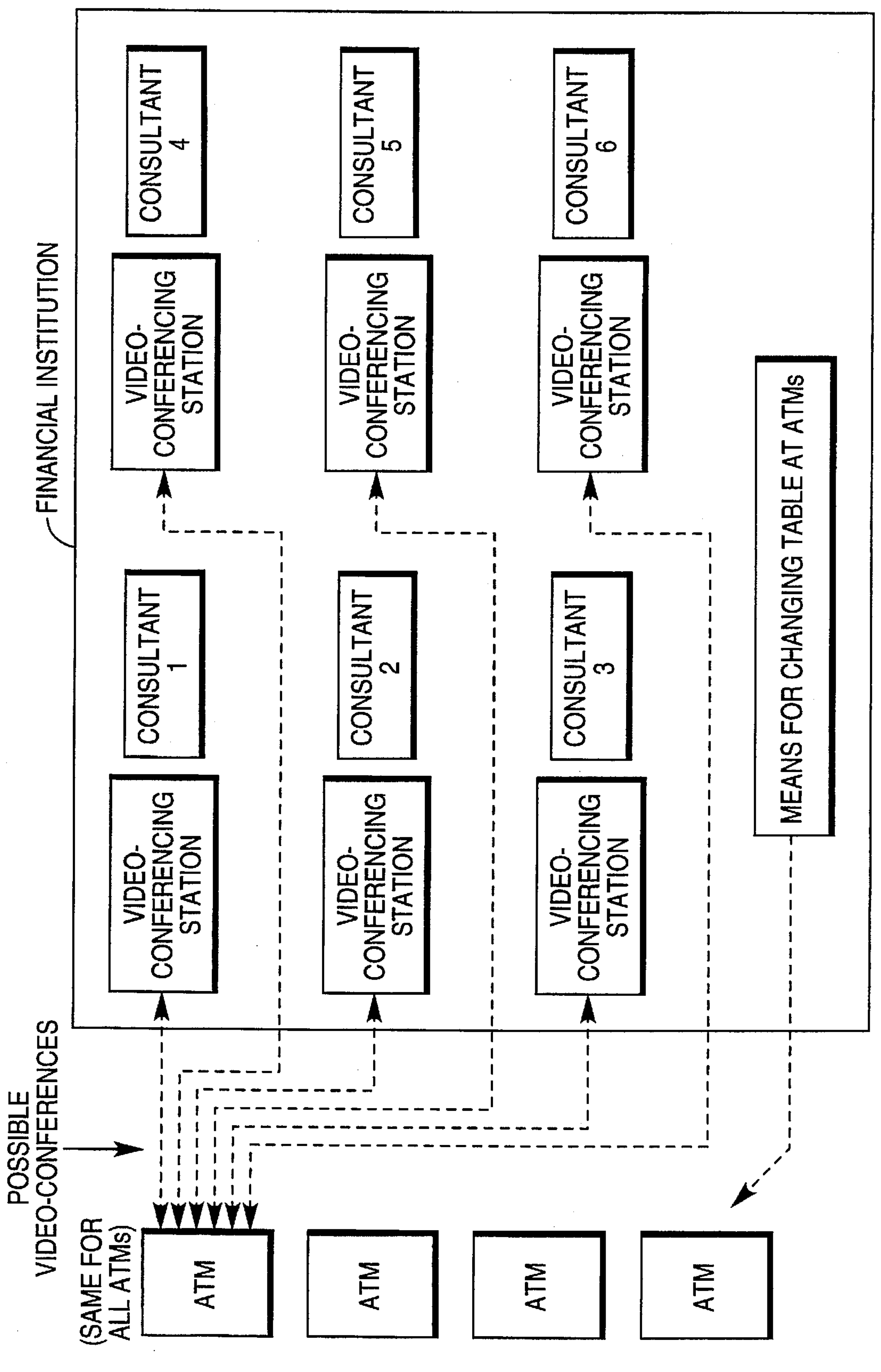
FIG. 6 illustrates another form of the invention.

4. FIG. 6 illustrates a simplified view of one form of the invention. Multiple ATMs are shown. Multiple consultants, each staffing a video conferencing station, are shown located at the financial institution. Each ATM, when requested by its customer, can select a consultant, and establish a video conference with that consultant, based on the stage of the transaction of the customer.

5. It is not necessary that the consultants be located in a single building. As ISDN telephone service becomes more widespread, and available at residences, certain consultants may wish to operate from their homes. In such a case, the TABLE of FIG. 4 would contain the proper telephone number for such consultants.

In addition, a given consultant may be of the roving type, and may use different teleconferencing stations throughout the day. In such a case, multiple TABLEs of the type shown in FIG. 4 would be used. As a simplified example, assume that a given consultant uses a first teleconferencing station during mornings, and a second station during afternoons. The second station may be located at the consultant's residence.

The invention contains two TABLEs. One TABLE is used in mornings, and contains the telephone number of the first station. Another TABLE is used in afternoons, and contains the telephone number of the second station. Simple logic selects which table to use when the consultant is needed, based on the time-of-day.

Larger numbers of different TABLEs can be used, to accommodate larger numbers of consultants, using larger number of different conferencing stations.

6. A roving consultant need not be bound to a predetermined schedule for staffing different stations. If a consultant wishes to change stations, the consultant can change the telephone number contained in the TABLE remotely, by downloading a new number, or selecting one of several numbers already present in the TABLE. It is known in the art how to perform such changing of the TABLE.

In a general sense, one aspect of the invention is to provide the ability for a consultant to change, from a remote location, the telephone number, contained in the TABLE, at which the consultant can be reached. FIG. 6 schematically illustrates this.

7. All software shown in FIG. 5 runs on a single computer, namely, the PC shown in FIGS. 1 and 2. In one embodiment, the computer is based on architecture designed around the 8xx86 processor, manufactured by INTEL Corporation, Santa Clara, Calif. The computer runs a pre-emptive, multitasking operating system, such as OS/2, available from IBM Corporation, Armonk, N.Y. The pre-emptive feature allows certain tasks to take precedence over others. The multitasking allows all software to run together.

8. An alternate example of ascertaining the stage of the customer's transaction is given by the following Illustration.

Illustration

Assume, for simplicity, that the ATM CONTROL SOFTWARE shown in FIG. 5 contains 80 lines of code. Assume that the following lines of code represent the indicated functions (or stages in the transaction):

| Lines | Function |
|---|---|
| 1–9 | Log-in Procedure |
| 10–19 | Initial menu. Provides these options-<br>1 - Cash withdrawal from checking account<br>2 - Cash withdrawal from savings account.<br>3 - Balance inquiry of savings account.<br>4 - Balance inquiry of checking account. |
| 20–29 | Executes option 1. |
| 30–39 | Executes option 2. |
| 40–49 | Executes option 3. |
| 50–59 | Executes option 4. |
| 60–69 | Asks if customer wants another transaction. |
| 70–80 | Log-out procedure. |

The invention can add a few lines of code which indicate which lines of code are currently running, thereby indicating the stage of the transaction. These few lines can place data into a register (called a stage register herein) which indicates the lines of code which are presently being executed. (Alternately, the program counter of the microprocessor can be monitored.)

The invention monitors the stage register, and simultaneously looks for a request for a video conference from the customer. When a request is received, the invention notes the stage of the transaction, based on the stage register's contents, and dials the appropriate telephone number.

9. The preceding discussion indicated that each different window in FIG. 3 represents a transaction undertaken by a customer. Alternately, each window itself can be defined as including multiple transactions. That is, a given window may present buttons for several options (withdrawal from checking account, withdrawal from savings account, balance inquiry, etc.) The present transaction may include not only the window, but also the option selected. The $S^4$ software indicates which options were selected. (In general, the $S^4$ software records all data entry made by the customer.)

10. It should be recognized that the term "telephone number" is a term-of-art. It refers to an address by which telephonic equipment is contacted, using a telephone switching network. It does not refer to a mere number associated with a telephone. For example, the number "3", written on a public telephone booth, is not a "telephone number."

11. The $S_4$ software, discussed above, tracks each customer, by recording (a) the identify of each video screen which the customer visits and (b) the time of day, and length of the visit. Thus, the invention always knows "where" a customer is, during a transaction.

This information is used when the customer requests a video conference. For example, if the customer is viewing a screen which relates to automobile loans, then, when the customer requests a video conference, the invention patches the customer to a specialist in automobile loans, and not to a general information number.

12. The invention has the ability to allow the consultant to issue commands to the ATM. Thus, when a customer becomes patched with the consultant, the consultant can order the ATM's computer to display a particular screen, or play a particular video clip, to the customer.

A very simple explanation of this ability lies in the capabilities of the VISTIUM system. The VISTIUM system allows a remote party (if properly authorized) to select and launch a program stored on the ATM's computer. The VISTIUM system also allows remote parties to issue commands to a program running on the ATM's computer.

As another explanation, the invention allows the consultant to transmit a macro to the ATM's computer, which executes the appropriate actions. The multi-tasking abilities of the operating system allow execution of the macro.

Alternate Embodiment

Figure 7:
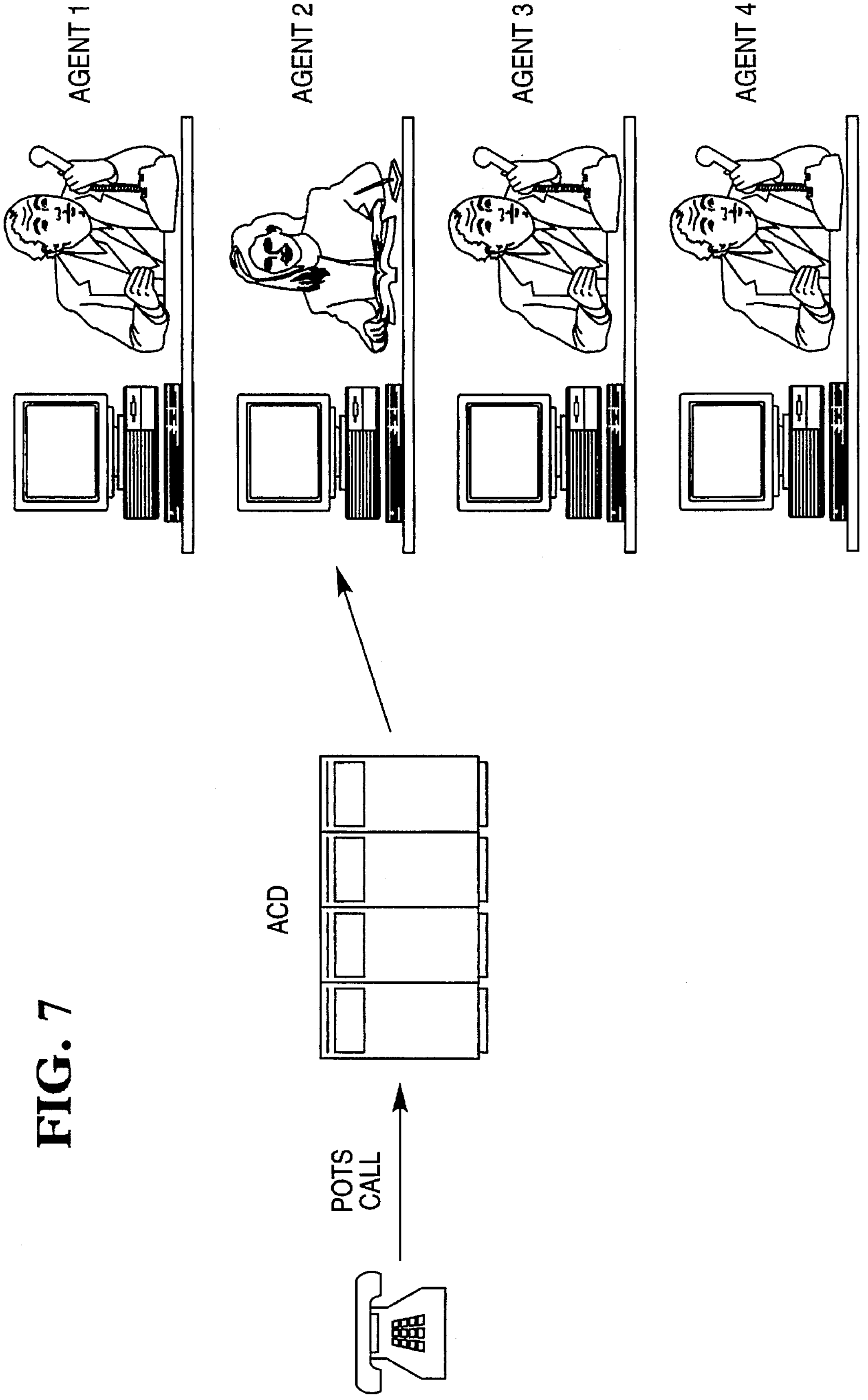
FIG. 7 illustrates an ACD, which hunts for a free agent, and routes an incoming call to the agent when found.

In another form of the invention, the bank maintains an Automated Call Distribution (ACD) system. Such systems are well known. ACDs are used, for example, by mail-order retailing firms, which accept telephone orders for merchandise from customers. An ACD is shown in FIG. 7. As the ACD receives each incoming call from a customer, it searches for a free AGENT, to take the customer's call. When a free AGENT is found, the ACD connects the incoming call with the free AGENT.

In the example of FIG. 7, the incoming call is routed to AGENT 2, as indicated by the arrow. The call is not routed to any of the other AGENTs, because they are busy with other telephone calls. This activity of the ACD is commonly called "hunting" and "distributing."

ACDs Cannot Handle Video Conferencing Calls

The call illustrated in FIG. 7 is an ordinary POTS call. For technical reasons which need not be elaborated here, presently available ACDs cannot, in general, distribute video calls, as required to establish the video conference as described above. That is, the ACDs cannot search for a free AGENT, as in FIG. 7, and route a video call to the free AGENT.

Simplified View of Embodiment

Figure 8:
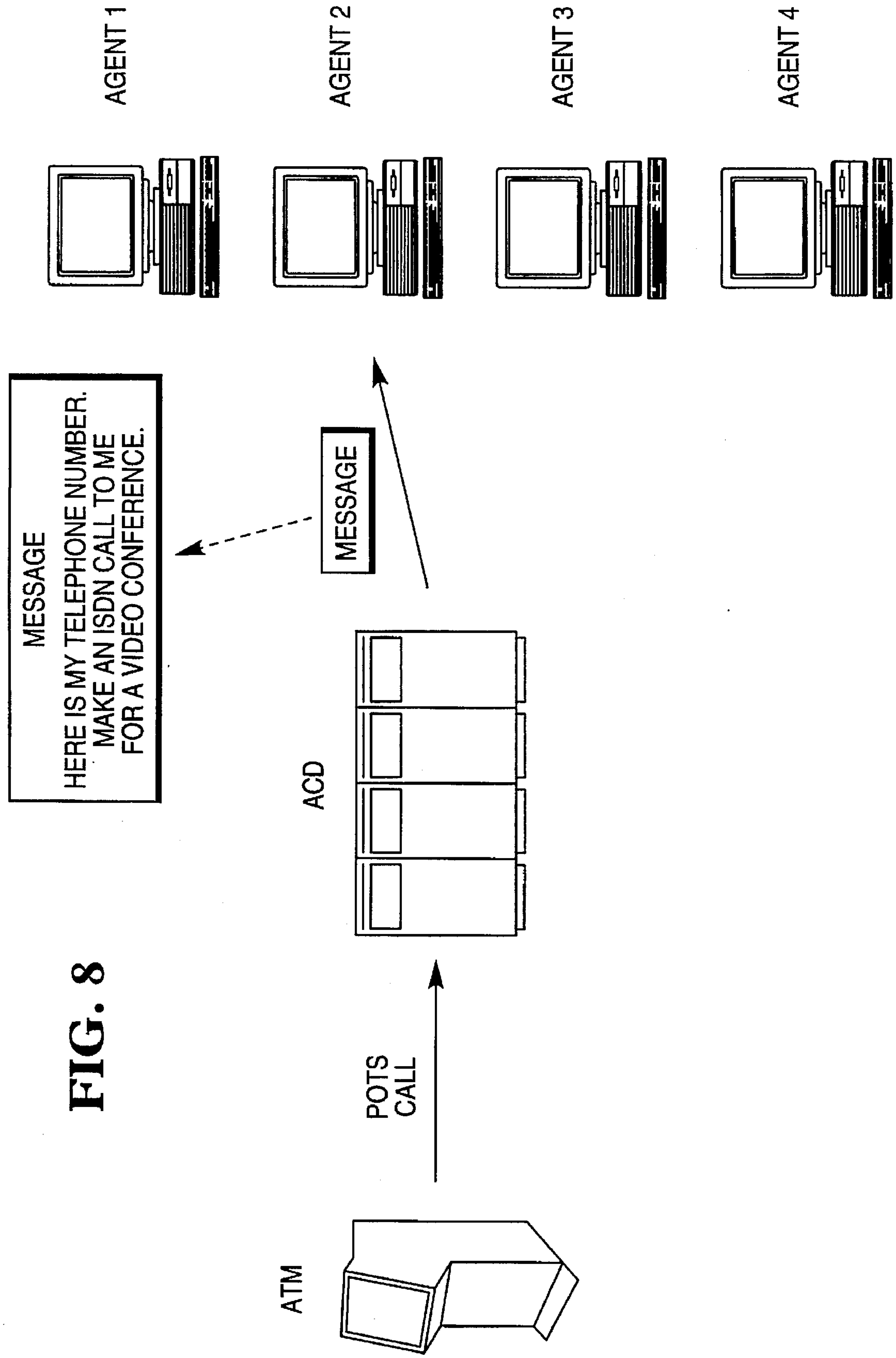
FIG. 8 illustrates delivery of a MESSAGE to AGENT 2, by the ACD.

As shown in FIG. 8, the ATM places a POTS call, which contains a MESSAGE. The ACD routes the POTS call to AGENT 2. The MESSAGE is delivered to the computer of AGENT 2. The MESSAGE identifies the ATM, and asks that AGENT 2 establish a video conference with the ATM.

More Detail: PROGRAM Creates Data Link and Sends Message

Figure 9:
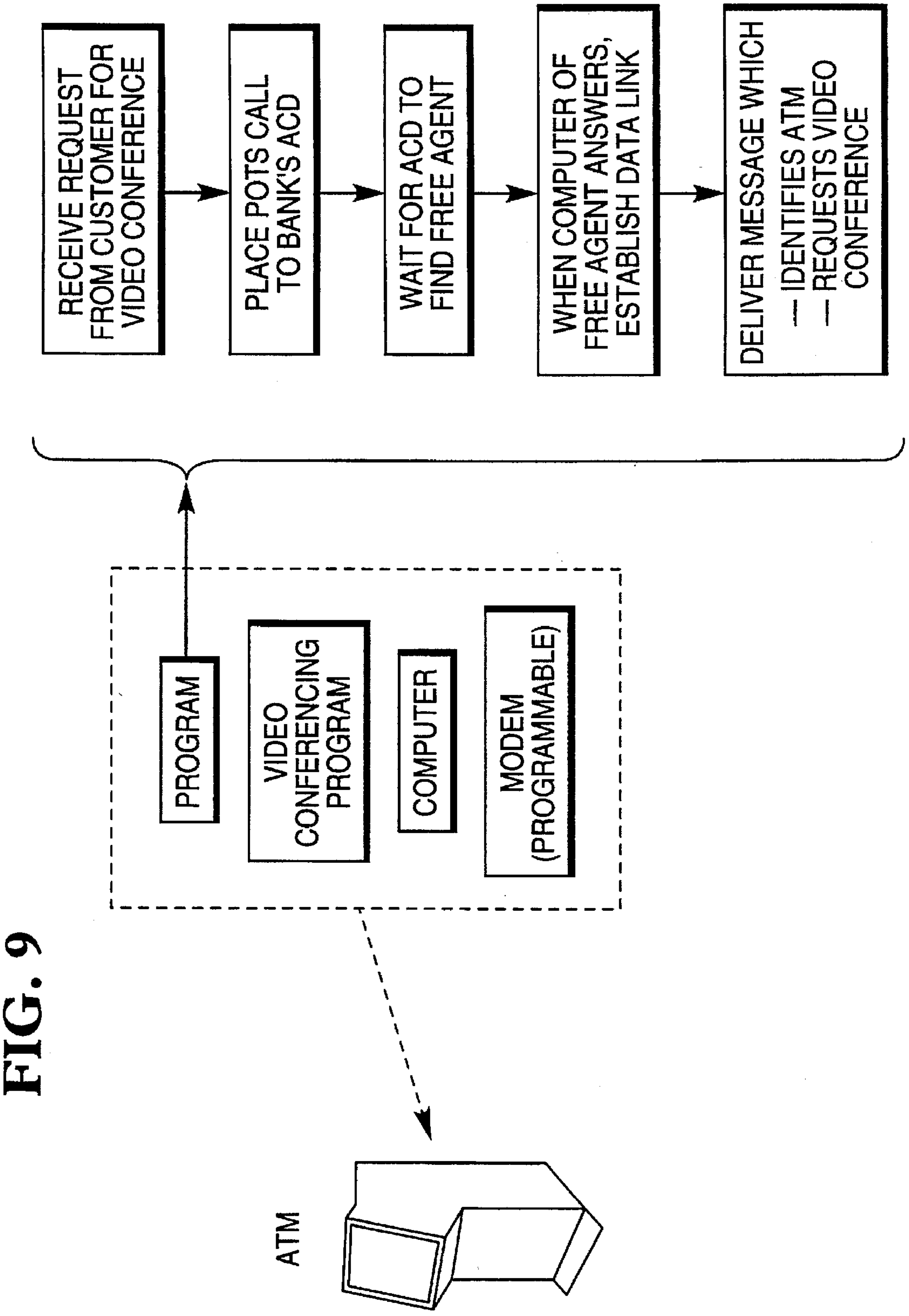
FIG. 9 illustrates apparatus contained within the ATM, and a flow chart representing logic followed by the PROGRAM shown.

In response to a customer's request for a conference, a PROGRAM, shown in FIG. 9, is executed. This PROGRAM runs on a computer contained within the ATM. This PROGRAM places a POTS data call (as opposed to a POTS voice call) to the bank, as indicated by the flow chart in FIG. 9. (The ATM thus acts as the initiating station for a video conference.)

This POTS call is received by an ACD servicing the bank, as indicated by the arrow in FIG. 8, and, in the usual manner, the ACD locates a free AGENT, which is AGENT 2 in this example. Then, having located the free AGENT, the ACD directs the POTS data call to the free AGENT's computer, as indicated. (In contrast, the ACD of FIG. 7 directs the call to the free AGENT's telephone, not to a computer.) The POTS data call of FIG. 8 contains a MESSAGE for the free AGENT.

Data Link is Established

For the MESSAGE to be delivered, a data link must be established between the ATM and the free AGENT's computer. Programmable modems establish the data link. One modem is located at the ATM, and another is located at the free AGENT's computer. For the data link to be established, both modems must agree on parameters which include the following:

baud rate (e.g., 1200, 2400), number of data bits per frame (e.g., 8 or 7), type of parity (e.g., even, odd, or none), and number of stop bits (e.g., 1, 1.5, or 2).

These parameters, and other information, are exchanged between the two modems, according to the programming of the modems.

Programmable modems are known in the art. One type is model PM 14400 FX V.32 bis, available from Practical Peripherals, located in Thousand Oaks, Calif. Programming such modems, to automatically establish a data link, in order to deliver the MESSAGE, is also known in the art.

A key feature of the programmable modems is that no human intervention, or insignificant human intervention, is required to either set up the data link, or deliver the MESSAGE to the free AGENT's computer.

Eliminating human intervention is within the skill of the art. By analogy, facsimile (FAX) machines accomplish a very similar task, without human intervention. FAX machines can be pre-programmed with frequently called telephone numbers. To send a FAX, a person selects one of the pre-programmed numbers, analogous to a person requesting a video conference. The FAX machine dials the number, and establishes a data link with another FAX machine, without further human intervention.

Content of Message

The MESSAGE of FIG. 8(*a*) requests the free AGENT's computer to place a video conferencing call to the ATM and (*b*) provides the free AGENT's computer with the telephone number to call.

As to providing the telephone number, the ATM can include the actual telephone number within the MESSAGE. Alternately, the ATM can identify itself by a code. The free AGENT's computer maintains a table which associates a telephone number with each code. The free AGENT's computer looks up the telephone number in the table.

Free AGENT's Computer Makes Video Conferencing Call

Figure 10:
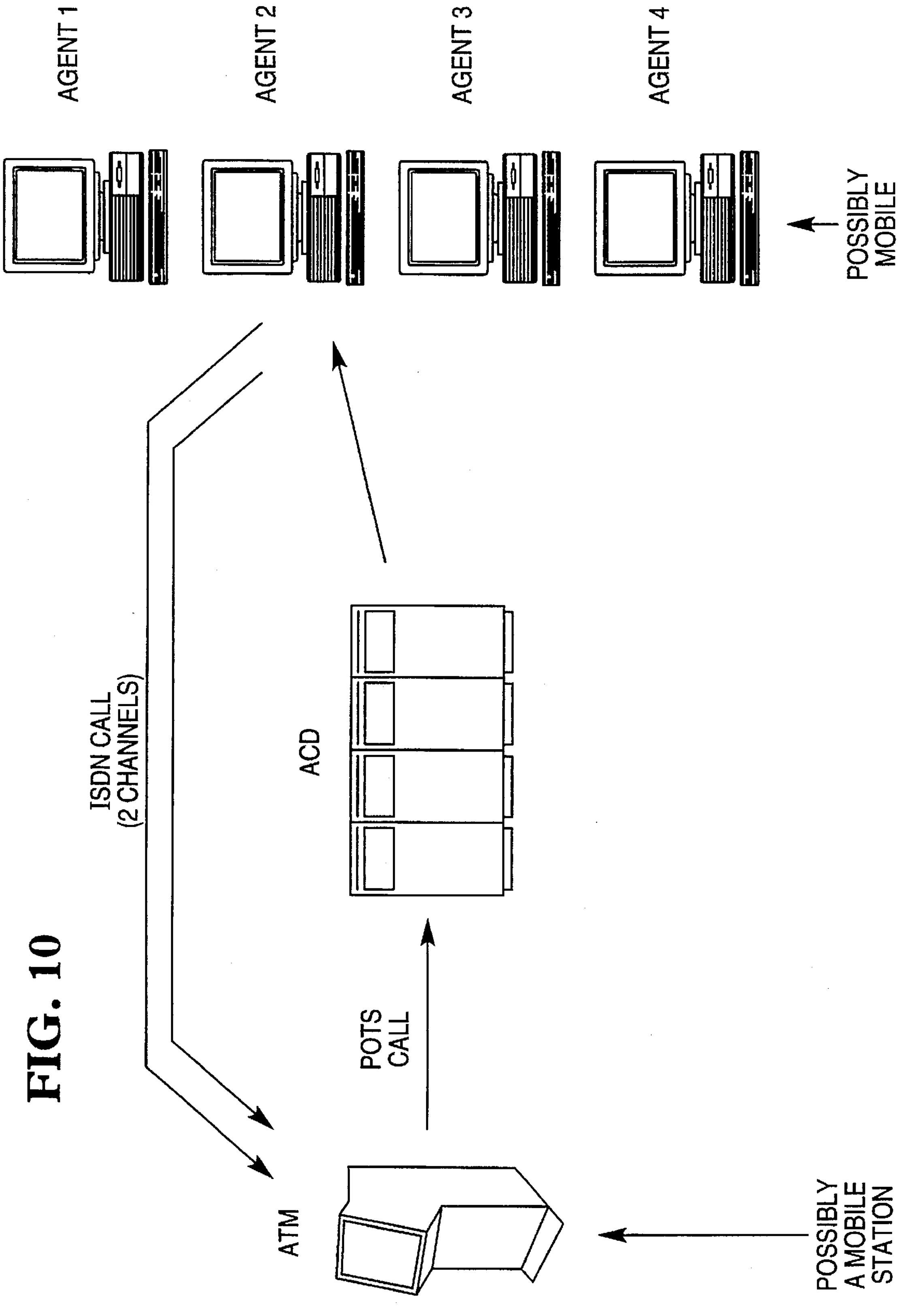
FIG. 10 illustrates a high-bandwidth call made by AGENT 2, in response to the MESSAGE of FIG. 8.
Figure 11:
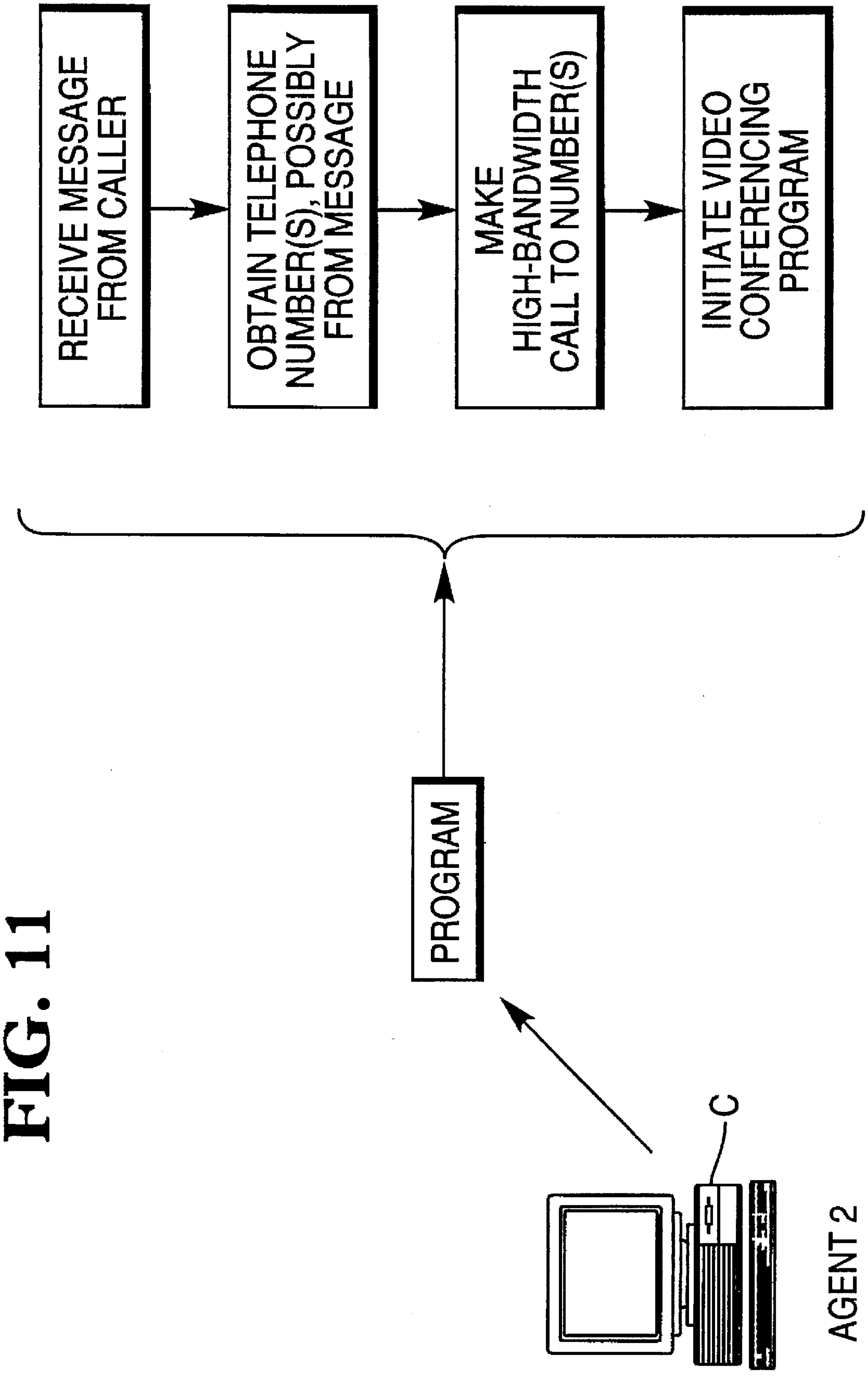
FIG. 11 illustrates a PROGRAM resident in the computer of AGENT 2, and a flow chart of logic which this PROGRAM follows.

The free AGENT's computer then places the video conferencing call to the ATM, as indicated in FIGS. 10 and 11. The video call is placed over a high-bandwidth telephone channel, such as commercially available ISDN, as indicated. The video conferencing call is not placed over a POTS line.

Commercially available systems, such as VISTIUM, available from AT & T Global Information Solutions Company, Naperville, Ill., provide the ability to hold such conferences. In the present context, the VISTIUM system (indicated by the block VIDEO CONFERENCING PROGRAM in FIG. 9) is placed into "autoanswer" mode, for answering the call made by the free AGENT's computer, and establishing the video conference.

Initial POTS Call is Maintained

During the video conference, the initial call, made over the POTS line, can be maintained, and not terminated. There are two primary reasons for maintaining this POTS call.

Maintaining POTS Call Indicates that AGENT is Busy

One reason is that, once the video conference begins, the formerly free AGENT now becomes occupied, and is no longer free. Subsequent incoming calls from other customers should not be routed to this AGENT by the ACD during this time.

Maintaining the initial POTS call, even though no information is transferred, acts as a signal to the ACD that the AGENT is not free. Restated, maintaining the POTS call, though idle, gives a "busy" signal to the ACD.

ACD Monitors POTS Calls

A second reason is that monitoring equipment is used, either as part of the ACD, or in adjunct to the ACD. This equipment monitors the calls taken by the AGENTs. For example, the equipment can log each call taken by an AGENT, as to duration and time of occurrence, and thereby provide a record of each AGENT's daily telephone activity.

If the initiating POTS call were terminated after the video conference were established, then the monitoring equipment would obtain information which is not useful. That is, for each video conference established, the monitoring equipment would detect a very short POTS call handled by an AGENT, but would not detect the subsequent video conference. A log of such short POTS calls would provide information which is non-useful, and possibly misleading.

Therefore, the POTS call is maintained in order to support the call logging and reporting system associated with the ACD.

Recapitulation

The invention undertakes the following steps.

1. The customer of the ATM requests a video conference with a representative of the bank.
2. A computer located at the ATM makes a POTS data call (as opposed to a POTS voice call) to the bank, which is received by an ACD. The ACD locates a free AGENT, and directs the POTS call to the free AGENT's computer.
3. The POTS call delivers a MESSAGE which (a) requests the free AGENT to make a video conferencing call to the ATM, and (b) provides a telephone number for the free AGENT to call.
4. The free AGENT's computer calls the number provided by the message, and establishes a video conference.
5. The initial POTS call may be maintained with the free AGENT.

ACD Can Distribute Video Call

The preceding discussion assumed that the ATM sent a MESSAGE to an ACD, which delivered the MESSAGE to a FREE AGENT, whose computer made a return video call to the ATM.

An alternate approach is to hold an audio telephone conference with the FREE AGENT, and eliminate the video aspect. That is, the general procedure is the following:

1. The customer of the ATM requests assistance from a consultant.
2. The ATM dials the ACD.
3. The ACD finds a FREE AGENT, and distributes the ATM's call to the FREE AGENT. An audio conference is now established.

This general procedure finds a FREE AGENT, but the FREE AGENT will not necessarily possess expertise in the matter about which the customer requested assistance. In an alternate approach, such an expert is found.

Under the alternate approach, when each AGENT signs on with the ACD, indicating that the AGENT is available to accept calls, the AGENT provides an indication of the AGENT's field of expertise. For example, AGENT 1 may transmit number "999" to the ACD, indicating that the field of expertise is mortgage loans. AGENT 2 may transmit "888," indicating automobile loans, and so on.

The PROGRAM in FIG. 9, which makes the call at the request of the customer, obtains the customer's current position from the $S^4$ software. (That is, the PROGRAM learns what current screen the customer is now visiting, and learns what screens, and for how long, the customer previously visited.)

The PROGRAM then deduces what field of expertise is required, and informs the ACD of this field. The ACD then (1) searches for FREE AGENTS, (2) when one is found, inquires as to the FREE AGENT's field of expertise, (3) if the field matches the customer's needs, the ACD routes the call to that FREE AGENT, (4) if the field does not match, the ACD seeks another FREE AGENT, and repeats steps 2–4.

Alternately, the PROGRAM can inform the ACD of the customer's current position, and the ACD can make the determination as to the field of expertise needed.

Commercially available ACDs possess sufficient processing power, and can be programmed in order to accomplish the preceding tasks.

Second Recapitulation

In the alternate embodiment under discussion, the following events occur:

1) A customer of an ATM requests assistance.

2) The ATM places a call to an ACD. The ATM, or the ACD, or both, determine the field of expertise required to assist the customer.

3) The ACD finds a FREE AGENT having the required expertise.

4) The ACD either
   i) patches the customer with the FREE AGENT, via an audio call, or
   ii) delivers a MESSAGE, which requests the FREE AGENT's computer to establish a video conference with the ATM. The computer then does so.

Numerous substitutions and modifications can be undertaken without departing from the true spirit and scope of the invention. What is desired to be secured by Letters Patent is the invention as defined in the following claims.

We claim:

1. In an ATM which allows a customer to undertake multiple, different transactions, the improvement comprising:

a) means for detecting a request by a customer for assistance with a transaction, b) means for
   i) identifying the transaction, without intervention of the customer,
   ii) selecting a consultant who is expert in the type of transaction identified, and
   iii) establishing a video conference with the selected consultant.

2. A communication system comprising:

a) a plurality of ATMs, at different locations, each
   i) having video conferencing capability and
   ii) allowing a customer to engage in multiple transactions;

b) several video conferencing stations;

c) means for
   i) detecting a user's request for assistance with a transaction;
   ii) selecting one of the video conferencing stations, based on the transaction; and
   iii) establishing a video conference between the selected station and the user's ATM.

3. A communication system, comprising:

a) an ATM, having video conference capability, which
   i) stores a telephone number of a remote video conferencing station, and
   ii) using said telephone number, establishes a video conference with said video conferencing station, when requested by a customer;

b) means for allowing a remote person to change said telephone number.

4. A system, comprising:

a) an ATM, which
   i) detects a request for assistance by a customer;
   ii) identifies a type of transaction undertaken by the customer, when the request was made;
   iii) in response to the request, places a call; and b) ACD means, for
   i) receiving the call;

ii) cooperating with the ATM in locating a free agent having expertise in the type of transaction identified; and iii) routing the call to the free agent.

5. In an ATM, which makes multiple transactions available to a customer, the improvement comprising:

a) means for identifying a transaction currently undertaken by a customer;

b) table means which is changed by software at predetermined times and for associating a telephone number with each available transaction; and c) means for changing said telephone numbers.

6. In an ATM, which makes multiple transactions available to a customer, the improvement comprising:

a) means for identifying a transaction currently undertaken by a customer;

b) table means which is changed by instructions received on a telephone channel from a remote location and for associating a telephone number with each available transaction; and c) means for changing said telephone numbers.

* * * * *